United States Patent
Wulff et al.

(10) Patent No.: US 7,018,711 B2
(45) Date of Patent: Mar. 28, 2006

(54) MICRO-CAPSULES COMPRISING A CAPSULE CORE CONTAINING WATER-SOLUBLE SUBSTANCES

(75) Inventors: Dirk Wulff, Schifferstadt (DE); Ekkehard Jahns, Weinheim (DE); Harald Röckel, Neustadt (DE); Volker Schehlmann, Schopfheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 140 days.

(21) Appl. No.: 10/475,588

(22) PCT Filed: Apr. 20, 2002

(86) PCT No.: PCT/EP02/04378

§ 371 (c)(1),
(2), (4) Date: Oct. 23, 2003

(87) PCT Pub. No.: WO02/085510

PCT Pub. Date: Oct. 31, 2002

(65) Prior Publication Data

US 2004/0089961 A1    May 13, 2004

(30) Foreign Application Priority Data

Apr. 25, 2001  (DE)  ................ 101 20 480
Jun. 25, 2001  (DE)  ................ 101 34 491

(51) Int. Cl.
*B32B 15/02*  (2006.01)
*C09D 1/00*  (2006.01)

(52) U.S. Cl. ................ 428/402.21; 264/4.1; 264/4.33; 264/4.7; 106/31.01; 106/31.13; 106/31.27; 106/31.65; 428/364

(58) Field of Classification Search ................ 264/4.1, 264/4.33, 4.7; 106/31.01, 31.13, 31.27, 31.65; 428/402.21, 364

See application file for complete search history.

(56) References Cited

U.S. PATENT DOCUMENTS

| 3,418,656 | A | * | 12/1968 | Vassiliades | ................ 503/215 |
| 4,842,978 | A | * | 6/1989 | Ishikawa | ................ 430/138 |
| 4,918,317 | A | | 4/1990 | Hess et al. | |
| 5,204,185 | A | * | 4/1993 | Seitz | ................ 428/402.21 |
| 5,401,577 | A | * | 3/1995 | Seitz | ................ 428/402.21 |

FOREIGN PATENT DOCUMENTS

| EP | 0 026 914 | 4/1981 |
| EP | 0 218 887 | 4/1987 |
| EP | 0 492 793 | 7/1992 |
| EP | 0974 394 | 1/2000 |
| EP | 0 978 312 | 2/2000 |
| JP | 60-244336 | 12/1985 |
| WO | 91/10506 | 7/1991 |
| WO | 99/40123 | 8/1999 |

* cited by examiner

*Primary Examiner*—Samuel A. Acquah
(74) *Attorney, Agent, or Firm*—Oblon, Spivak, McClelland, Maier & Neustadt, P.C.

(57) ABSTRACT

Microcapsules having a capsule core comprising water-soluble organic substances, and a capsule coating which is a condensate of formaldehyde resins and/or alkyl ethers thereof, a process for their preparation, their use, and compositions comprising the microcapsules.

10 Claims, No Drawings

MICRO-CAPSULES COMPRISING A CAPSULE CORE CONTAINING WATER-SOLUBLE SUBSTANCES

The present invention relates to microcapsules having a capsule core comprising water-soluble organic substances, and a capsule coating which is a condensate of formaldehyde resins and/or alkyl ethers thereof, to a process for their preparation, to their use, and to compositions comprising the microcapsules according to the invention.

Microcapsules based on melamine-formaldehyde resin having core oils comprising color formers have been known for a long time in the field of copy papers (see e.g. EP-A-0 026 914 and EP-A-0 218 887). They are obtained by polycondensation of the resins of an oil-in-water emulsion that are located in the aqueous phase.

Also known, from U.S. Pat. No. 3,418,656, are microcapsules with melamine-formaldehyde resin condensates as wall material and an emulsion as core.

WO 91/10506 teaches microcapsules with an aqueous core, whose walls form by the reaction of a water-soluble Lewis acid, such as carboxymethylcellulose, with a Lewis base dissolved in the lipophilic phase, such as benzalkonium chloride. The materials encapsulated are medicinal active ingredients which, since the capsule walls are not sealed, are released in a delayed manner.

JP-60-244336 teaches microcapsules with walls of hexamethoxyhexamethylol-melamine resin. The hydrophobic melamine resin is polymerized in the core oil of the oil-in-water emulsion.

In principle, dye-containing polymers can be prepared by two different methods. One procedure consists in homogeneously dissolving dyes which have sufficient solubility in polymers, if necessary at elevated temperature, in said polymers. The advantage here is, in particular, a high brilliance of the color impression and a high color intensity, i.e. a low dye requirement. However, this procedure has the disadvantage that the dyes migrate on heating or when the polymers come into contact with solvents; this causes reduced weather and migration fastnesses since dye molecules which have migrated to the surface of the substrate are attacked by light or oxygen or are flushed out by solvents. The other procedure consists in distributing insoluble color pigments in the polymer matrix in a dispersed manner. This avoids the disadvantages which may arise when the colorant is homogeneously dissolved in the polymer matrix. A disadvantage of this procedure, however, is that the individual dye molecules interact with one another in the pigment crystals, leading to a broadening of the absorption bands and thus to an undesired decrease in the purity of shade and color intensity of the coloration. Furthermore, the shape anisotropy of the pigment crystallites gives rise to rheology problems, such as thixotropies, on incorporation into the polymeric matrix.

The disadvantages of both procedures can, in principle, be circumvented by replacing the color pigments by dye-containing polymer dispersions in which the dye is distributed homogeneously in the polymer particles. Such "pigments" should on the one hand be characterized by a high color brilliance and purity of shade and should on the other hand be characterized by low rheology problems, owing to the spherical shape of the polymer particles.

WO 99/40123 describes aqueous polymer dispersions which are prepared by emulsion polymerization of dye-containing monomer solutions in aqueous phase.

Dyes used for polymer dispersions are hydrophobic since they have to be dissolved in the monomers or in the polymer. However, this limits the choice of dyes available.

It is an object of the present invention to provide organic water-soluble substances, such as dyes, in a form in which they behave inertly toward solvents.

We have found that this object is achieved by the above-described microcapsules.

The capsules comprise a capsule coating and a capsule core. The capsule core comprises at least one water-soluble organic substance as solid and/or, depending on the preparation, as solution in a hydrophilic solvent. Preferred capsule cores are solutions of the water-soluble organic substance.

The basic principle of capsule formation is that the formaldehyde resin dissolved in the hydrophilic solvent and which is the hydrophilic phase of a water-in-oil emulsion becomes insoluble over the course of the condensation and migrates to the interface of the hydrophobic phase, where it forms the capsule wall.

Hydrophilic solvent is to be understood as meaning either water or those aqueous solutions which, apart from water, comprise up to 20% by weight of a water-miscible organic solvent, such as $C_1$- to $C_4$-alkanols, in particular methanol, ethanol, isopropanol or a cyclic ether, such as tetrahydrofuran.

Suitable hydrophilic solvents are also ethylene glycol, glycerol, polyethylene glycols and butylene glycol, and their mixtures. Preferred hydrophilic solvents are water and mixtures of these solvents with water.

Suitable hydrophobic phases of the water-in-oil emulsion are solvents with only limited miscibility with water so that phase separation takes place. Hydrophobic solvents which may be used are virtually all water-immiscible liquids which do not interfere with the polycondensation, i.e. are inert. Solvents suitable according to the invention are preferably solvents with a solubility in water at 20° C. of $\leq 65$ g/l. Preference is given here to using aliphatic and aromatic hydrocarbons or their mixtures. Suitable aliphatic hydrocarbons are, for example, pentane, hexane, heptane, octane, nonane, decane, cyclohexane, decalin, methylcyclohexane, isooctane and ethylcyclohexane. Suitable aromatic hydrocarbons are, for example, benzene, toluene, xylene and isopropylbenzene. In addition, it is also possible to use halogenated hydrocarbons, such as tetrachloroethane, hexachloroethane, trichloroethane and chlorobenzene. In addition, aliphatic esters, such as ethyl acetate, are suitable. Preference is given to using aliphatic hydrocarbons and, in particular, cyclohexane. Preference is given to solvents whose boiling point is $\leq 120°$ C. since these solvents can be removed advantageously if the microcapsules are dried.

A water-soluble organic substance is to be understood as meaning a compound based on carbon which is at least partially soluble in water. The organic substance must have greater affinity to the hydrophilic phase than to the hydrophobic phase. This is generally ensured if the substance has a solubility in the hydrophilic solvent at room temperature of at least 1 g/l. The organic substances preferably have a solubility in the hydrophilic solvent of $\geq 20$ g/l.

The water-soluble, organic substances are, for example, water-soluble dyes.

The term "dye" includes here and below organic compounds or salts of organic compounds, and charge transfer complexes of organic compounds containing a chromophore which has an absorption maximum in the wavelength range from 400 to 850 nm and thus gives rise to a color impression for the human eye (conventional dyes) and which itself may also emit light in the visible region (fluorescent dyes). For the purposes of this invention, dyes are also compounds with an absorption maximum in the range from 250 to 400 nm which, upon irradiation with UV light, emit fluorescent radiation in the visible region (optical brighteners). For the purposes of this invention, dyes are also organic compounds which absorb light of wavelength <400 nm and deactivate it in a nonradiative manner (UV stabilizers).

The water-soluble dyes usually have ionic functional groups which improve the solubility in the aqueous solvent. In this connection, the modification can be carried out cationically or anionically. Suitable substituents are, for example, sulfonic acid, carboxylic acid and phosphoric acid radicals, and also ammonium and alkylammonium radicals.

Dyes suitable according to the invention include a variety of classes of dyes having various chromophores, for example monoazo and disazo dyes, triarylmethane dyes, metal complex dyes, such as phthalocyanine dyes, quinophthalones and methine and azamethine dyes.

By way of example, reference may be made to the following Colour Index numbers:

Direct Yellow 4, 5, 11, 50, 127, 137, 147, 153; Acid Orange 7, 8; Direct Orange 15, 34, 102; Direct Red 81, 239, 252–255; Direct Violet 9, 51; Acid Blue 9, 86; Direct Blue 199, 218, 267, 273, 279, 281; Acid Black 194, 208, 210, 221; Direct Black 19, 161, 170 and 171;

Basic Red 1, Basic Red 14, Basic Blue 7, Basic Blue 11, Basic Blue 26, Basic Violet 1, Basic Violet 4, Basic Violet 10 etc.

The dyes also include complexes of basic and acidic dyes and complexes of anionic and cationic dyes, for example the complex of chrysoidine base and metanil yellow acid.

According to the invention, the dyes also include optical brighteners which are at least partially soluble in water.

In accordance with the definition, the organic dyes also include UV-ray-absorbing compounds (UV stabilizers) which deactivate the absorbed radiation in a nonradiative manner. Such compounds are frequently used as UV absorbers in sunscreen compositions. These include derivatives of p-aminobenzoic acid, in particular its esters; salicylates, cinnamates, benzophenones, 2-phenylbenzimidazole-4-sulfonic acid and salts thereof, urocanic acid, salts thereof and esters thereof, benzoxazoles, benzotriazoles, benzylidenecamphor and its derivatives.

Depending on the color intensity of the dye, the microcapsule usually comprises at least 0.1% by weight, based on the hydrophilic solvent, preferably 1 to 50% by weight and in particular 5 to 20% by weight, of at least one dye.

The capsule coating according to the invention is a condensate of formaldehyde resins and/or alkyl ethers thereof. Formaldehyde resins are, for example, reaction products of formaldehyde with triazines, such as melamine
carbamides, such as urea
phenols, such as phenol, m-cresol and 3,5-xylene
amino and amido compounds, such as aniline, p-toluenesulfonamide, ethyleneurea and guanidine, or their mixtures.

Preferred formaldehyde resins are urea-formaldehyde resins, urea-resorcinol-formaldehyde resins, urea-melamine resins and melamine-formaldehyde resins. Also preferred are the $C_1$–$C_4$-alkyl, in particular methyl, ethers of these formaldehyde resins, and the mixtures with these formaldehyde resins. Particular preference is given to melamine-formaldehyde resins and/or methyl ethers thereof. A preferred starting material for the wall material are melamine-formaldehyde resins and/or methyl ethers thereof, with a ratio of melamine:formaldehyde of from 1:1.5 to 1:8 in the resin, preferably 1:3 to 1:6. These resins are N-methylolmelamine compounds or methyl ethers thereof. The resins used for the process according to the invention must be miscible with the hydrophilic solvent in any ratio without producing clouding. For these reasons, partially etherified methylolmelamines are particularly preferred.

The present invention also covers a process for the preparation of the microcapsules having a capsule core comprising water-soluble organic substances, and a capsule coating, by condensing formaldehyde resins in the hydrophilic phase of a water-in-oil emulsion in the presence of a protective colloid.

In order to obtain a stable water-in-oil emulsion, surface-active substances such as protective colloids are required. Such protective colloids are known from processes for inverse suspension polymerization, cf. DE-A-1081228 and DE-A-3709921. Use is usually made of protective colloids which dissolve in the hydrophobic phase.

Examples of suitable hydrophobic protective colloids are alkylated polyvinylpyrrolidones, ethylene oxide/propylene oxide copolymers and ethoxylated fatty alcohols (EO degree=3 to 50, alkyl radical: $C_8$ to $C_{36}$).

Preference is given to hydrophobic protective colloids based on copolymers of monoethylenically unsaturated carboxylic acids with monovinylaromatic comonomers, e.g. styrene, esters of (meth)acrylic acid, vinyl acetate, acrylamide, methacrylamide, acrylonitrile and hydroxyalkyl (meth)acrylates.

Protective colloids which have proven particularly advantageous are those obtainable by grafting polymers A) comprising
  a) 40 to 95% by weight of monovinylaromatic monomers,
  b) 5 to 60% by weight of monoethylenically unsaturated carboxylic acids having 3 to 6 carbon atoms, maleic anhydride and/or itaconic anhydride and
  c) 0 to 20% by weight of other monoethylenically unsaturated monomers,
  with the proviso that the sum of the percentages by weight (a) to (c) is always 100 and the polymers (A) have a molecular weight (number-average) of from 500 to 20 000, with monomer mixtures comprising
  a) 70 to 100% by weight of acrylic esters and/or methacrylic esters of monohydric alcohols containing 1 to 20 carbon atoms,
  b) 0 to 15% by weight of monoethylenically unsaturated carboxylic acids having 3 to 6 carbon atoms, maleic anhydride and/or itaconic anhydride,
  c) 0 to 10% by weight of acrylic monoesters and/or methacrylic monoesters of at least dihydric alcohols,
  d) 0 to 15% by weight of monovinylaromatic monomers and
  e) 0 to 7.5% by weight of acrylamide and/or methacrylamide with the proviso that the sum of the percentages by weight a) to e) is always 100, where the monomers are used in an amount of from 97.5 to 50% by weight, based on the mixture of polymer (A) and monomers.

Such graft polymers and processes for their preparation are known from DE-A-3709921.

The polymers A) are copolymers of monovinylaromatic monomers with an ethylenically unsaturated carboxylic acid or an anhydride of a monoethylenically unsaturated carboxylic acid.

Suitable as component a) of the polymers A) are monovinylaromatic monomers, e.g. styrene, α-methylstyrene, α-alkylstyrenes having 2 to 6 carbon atoms in the alkyl radical, which may be straight-chain and/or branched, e.g. α-isobutylstyrene. Also suitable are vinylaromatics which, apart from the vinyl group on the aromatic core, carry a $C_1$- to $C_8$-alkyl group, e.g. vinyltoluene, tert-butylstyrene, halogenated styrenes, core (alkyl)-substituted α-alkylstyrenes having 1 to 8 carbon atoms in the core alkyl radical and having 1 to 6 carbon atoms in the α-alkyl radical, e.g. para-tert-butyl-α-methylstyrene. Preference is given to using styrene from this group of monomers. Components a) in particular styrene are preferably involved in an amount of 60 to 95% by weight in the construction of the polymer A).

The monomers of group b) include monoethylenically unsaturated carboxylic acids having 3 to 6 carbon atoms and/or anhydrides thereof, e.g. acrylic acid, methacrylic acid, ethacrylic acid, maleic acid, fumaric acid, itaconic acid, maleic anhydride, itaconic anhydride, vinyllactic acid, vinylphosphonic acid and vinylsulfonic acid. These monomers are either used alone or in a mixture. From this group of monomers, preference is given to using acrylic acid, methacrylic acid, maleic anhydride and itaconic anhydride. The monomers of this group are preferably involved in an amount of 5 to 40% by weight in the construction of the polymers A).

Apart from the monomers of groups a) and b), up to 20% by weight of other monoethylenically unsaturated monomers may also be present in the polymers A) in polymerized form. This group of monomers includes, for example, the esters of acrylic acid, methacrylic acid and/or ethacrylic acid which are derived from alcohols having 1 to 12 carbon atoms, e.g. methyl acrylate, methyl methacrylate, tert-butylcyclohexyl acrylate, tert-butylcyclohexyl methacrylate, cyclohexyl acrylate, cyclohexyl methacrylate, tert-butyl acrylate, tert-butyl methacrylate, n-butyl acrylate, n-butyl methacrylate, isobutyl acrylate, isobutyl methacrylate, 2-ethylhexyl acrylate, 2-ethylhexyl methacrylate, and vinyl esters of saturated aliphatic carboxylic acids which contain 2 to 10 carbon atoms, e.g. vinyl acetate, vinyl propionate, vinyl laurate, vinyl butyrate and vinyl stearate. Another group of monomers are the amides of methacrylic acid, acrylic acid and ethacrylic acid. Here, these may, for example, be methacrylamide or acrylamide, and N-substituted amides, such as N-tert-butylmethacrylamide or N-tert-butylacrylamide. A further class of monomers which may be involved in the construction of the polymer A) are acrylonitrile and methacrylonitrile. The monomers of the group of c) can either be incorporated by polymerization into the copolymer A) alone or in a mixture in amounts up to 20% by weight. The sum of the percentages a), b) and c) is 100 in each case.

The polymers A) have a molecular weight (number-average) of from 500 to 20 000 and hydrogenation iodine numbers (in accordance with DIN 53241) of from 1.3 to 51, preferably 2.5 to 25.4. It is particularly preferred to use polymers A) whose hydrogenation iodine numbers are 5.1 to 16.9. The average molecular weight (number-average) of the polymers A) is preferably 1 000 to 10 000. Preference is given to using those polymers A) which are sparingly soluble in aliphatic hydrocarbons with a boiling range from 50 to 150° C.

Such polymers are known. They are prepared, for example, by homo- or copolymerization of the monomers a) to c) without diluent at 180 to 400° C., preferably 200 to 300° C. Particular preference is given to continuous bulk polymerization of the monomers which is carried out in the given temperature range and, in particular, at 200 to 260° C. and at pressures of from 1 to 100 bar, preferably 20 to 50 bar, in the absence of polymerization initiators or else in the presence of polymerization initiators and polymerization inhibitors. Such processes are described, for example, in DE-A-3026831, DE-A-3046476, U.S. Pat. No. 4,042,768 and WO 82/2387.

The polymers A) serve as graft base for the preparation of the protective colloids. For the preparation of the graft polymers, the procedure generally involves adding some of the polymerization initiator and some of the monomer mixture to a solution or dispersion of the polymers A) in an aliphatic and/or aromatic hydrocarbon—preference is given to using the same solvents which are subsequently used in the preparation of the microcapsules as hydrophobic inert solvents—and heating to an elevated temperature and, after the polymerization has started, adding the remaining monomers and the polymerization initiator.

The monomers of group a) used are acrylic esters and/or methacrylic esters of monohydric alcohols containing 1 to 20 carbon atoms. Examples of this group of monomers are methyl acrylate, methyl methacrylate, ethyl acrylate, ethyl methacrylate, propyl acrylate, isopropyl acrylate, propyl methacrylate, n-butyl acrylate, sec-butyl acrylate, tert-butyl acrylate, tert-butyl methacrylate, sec-butyl methacrylate, n-butyl methacrylate, tert-butylcyclohexyl acrylate, tert-butylcyclohexyl methacrylate, cyclohexyl acrylate, 2-ethylhexyl acrylate, 2-ethylhexyl methacrylate and lauryl acrylate. It is also possible to use the esters of ethacrylic acid which are derived from monohydric alcohols having 1 to 12 carbon atoms. From this group of monomers, preference is given to using acrylic esters and/or methacrylic esters of monohydric alcohols containing 3 to 6 carbon atoms. Very particular preference is given to the use of tert-butyl acrylate, n-butyl acrylate and isobutyl acrylate or mixtures thereof in an amount of from 85 to 98% by weight, based on the monomer mixture which is grafted onto the polymer A). The monomers of group a) are generally used in an amount of from 70 to 100% by weight, based on the monomers to be grafted. In the case of only a slight modification, the amount of monomers of group a) is 92.5 to 100% by weight.

Suitable monomers of group b) are monoethylenically unsaturated carboxylic acids having 3 to 6 carbon atoms and/or anhydrides thereof. This group of monomers corresponds to the monomers of group b) of polymers A). Specifically, these are, for example, acrylic acid, methacrylic acid, ethacrylic acid, fumaric acid, the anhydrides of said carboxylic acids and maleic anhydride. This group of monomers is optionally co-used in the preparation of the graft polymers and is present in an amount of from 0 to 15% by weight in the monomer mixture which is grafted onto the polymer A). From this group of monomers, preference is given to using acrylic acid, methacrylic acid, maleic anhydride or itaconic anhydride in an amount of from 0 to 7.5% by weight, based on the monomers.

A further group of monomers which can be grafted onto the polymer A) which may be mentioned are acrylic monoesters and/or methacrylic monoesters of at least dihydric alcohols. These include, for example, hydroxyethyl acrylate, hydroxyethyl methacrylate, hydroxypropyl acrylate, hydroxypropyl methacrylate, hydroxybutyl acrylate and hydroxybutyl methacrylate. This group of monomers is optionally co-used in a monomer mixture in an amount up to 10% by weight.

A further modification of the polymers A) can take place by grafting on monomers of group d). These monomers include monovinylaromatic compounds which may be present in an amount up to 15% by weight, preferably 1 to 7.5% by weight, in the monomer mixture. These monomers are identical to the monomers of group a) of polymers A). From this group of monomers, preference is given to using styrene.

A further modification can take place if the mixture of the monomers which are grafted onto the polymers A) comprises, as monomers e), optionally up to 7.5% by weight of acrylamide and/or methacrylamide.

The sum of the percentages by weight of the monomers of group a) to e) is always 100. The monomers a) to e) are used in an amount of from 97.5 to 50% by weight, preferably 90 to 75% by weight, based on the mixture of polymer A) and the monomers a) to e), for the preparation of the graft polymers.

The graft polymerization is generally carried out at temperatures up to 50° C., preferably from 50 to 150° C., preferably 60 to 120° C., in the presence of polymerization initiators, which are generally used in an amount of from 0.01 to 6% by weight, preferably 0.1 to 4% by weight, based on the weight of the polymers A) and the monomer mixture. The graft polymerization can be carried out at atmospheric pressure, and also at elevated or reduced pressure.

Polymerization initiators for the graft polymerization are known and are given, for example, in DE-A-3709921.

The K value according to Fikentscher (Cellulose Chemie, vol. 13, 48–64 and 71–74 (1932)) at 25° C. in a 1% strength by weight solution in tetrahydrofuran, of the graft copolymers to be used as protective colloids is 25 to 100, preferably 34 to 65.

The optimum amount of protected colloid is influenced firstly by the protective colloid itself, and secondly by the reaction temperature, the desired microcapsule size and the formaldehyde resin mixture. Simple series of experiments can readily determine the optimum amount required. To prepare the water-in-oil emulsion, the protective colloid is generally used in an amount of from 5 to 30% by weight, based on the hydrophobic phase.

The process for the preparation of the microcapsules according to the invention is generally carried out by emulsifying a mixture comprising the water-soluble organic substance and the formaldehyde resin and/or alkyl ethers thereof with the hydrophilic solvent in the hydrophobic solvent comprising the protective colloid to give fine droplets, it being possible to adjust the droplet size depending on the intended application purpose.

The condensation of the formaldehyde resin is carried out with acidic catalysis and is accelerated by increasing the temperature. In general, the condensation is carried out in a temperature range from 40 to 150° C. A pH of the aqueous solvent is generally chosen in the range from 3 to 6.5. The temperature during the formation of the water-in-oil emulsion is usually 20 to 45° C. In this temperature range, the polycondensation proceeds only very slowly, if at all. The capsule coating is then fully cured by increasing the temperature. Curing takes place at varying rates depending on the pH of the dispersion. In the pH range from 3 to 5, the polycondensation preferably takes place at temperatures up to 100° C., in particular 85° C. In a preferred embodiment, the temperature is increased continuously or stepwise starting at 40° C. to 100° C., preferably to 85° C. Where appropriate, heating is then carried out to temperatures up to 150° C. in order to achieve post-crosslinking. The optimum temperatures, depending on the pH, can be readily determined by simple experimental series.

The pH in the aqueous phase can be adjusted using acids, preferably using formic acid.

Dispersion of the core material is carried out in a known manner depending on the size of the capsules to be prepared. For the preparation of large capsules, dispersion using effective stirrers, in particular propeller or impeller stirrers, suffices. Small capsules, particularly if the size is to be below 50 µm, require homogenizers or dispersion machines, with or without forced-flow means.

The homogenization can also be carried out using ultrasound (e.g. Branson Sonifier II 450). For homogenization by means of ultrasound, suitable equipment is, for example, that described in GB 2250930 and U.S. Pat. No. 5,108,654.

The capsule size can be controlled via the speed of the dispersion apparatus/homogenization apparatus and/or using the concentration of the polymers carrying sulfonic acid groups or via the molecular weight thereof, i.e. via the viscosity of the aqueous continuous phase, within certain limits. Here, as the speed increases up to a limiting speed, the size of the dispersed particles decreases.

In this connection, it is important that the dispersion apparatuses are used at the start of the capsule formation. In the case of continuously operating apparatus with forced-flow, it is advantageous to pass the emulsion through the shear field a number of times.

The conditions optimum for individual cases, such as temperature, pH and stirrer speed, can be readily determined by a few experiments.

Using the process according to the invention it is possible to prepare microcapsule dispersions with a content of from 15 to 60% by weight of microcapsules. The microcapsules are individual capsules. If suitable conditions are chosen during the dispersion it is possible to prepare capsules with an average particle size in the range from 0.5 to 50 µm and above. Preference is given to capsules with an average particle size of from 0.5 to 50 µm, in particular up to 30 µm. The average particle diameter is the number-average particle diameter, determined by quasi-elastic dynamic light scattering. It is usually determined using a Coulter N4 Plus Particle Analyzer from Coulter Scientific Instruments. The size distribution of the capsules is particularly advantageously very narrow.

Despite the high concentration of capsules, the capsule dispersions have a very low viscosity and can therefore also be filtered rapidly through machine sieves having a mesh size of from 25 to 40 µm. During the filtration, it is found that the yield of microcapsules in the process according to the invention is very high.

The capsule dispersion obtained according to the invention can be further processed directly. For example, it can be incorporated into plastic molding compositions.

According to the invention, the microcapsules can also be used as powders. The preparation is generally carried out by spray-drying, optionally in the presence of spray auxiliaries, in a stream of warm air, or by freeze-drying. Processes for spray-drying and freeze-drying are known in principle to the person skilled in the art and can be transferred to the drying of the above-described microcapsule dispersion.

In the case of spray-drying, the procedure involves, for example, spraying the microcapsule dispersions to be dried in a customary drying tower in a stream of warm air. Here, the inlet temperature of the stream of warm air is in the range from 100 to 200° C., preferably 120 to 160° C., and the outlet temperature of the stream of warm air is in the range from 30 to 90° C. and preferably 60 to 80° C. The spraying of the microcapsule dispersion in the stream of warm air can be carried out, for example, using single-component or multi-component nozzles or via a rotating disk. The microcapsule powders are normally separated off using cyclones or filter separators. The sprayed microcapsule dispersion and the stream of warm air are preferably introduced in parallel.

Suitable spray auxiliaries, which are also referred to as drying auxiliaries, are neutral, cationic, anionic or amphoteric, water-soluble polymers. They generally have a molecular weight $M_N$ in the range from 1 000 to 1 000 000, preferably 2 000 to 100 000.

Specific examples of neutral polymers are: polyvinyl alcohols (see e.g. EP-A-56 622, EP-A-680 993, DE-A-22 14 410 and DE-A-26 14 261), polyvinylpyrrolidones (see e.g. DE 22 38 903 and EP 576 844). Examples of anionic polymers are phenolsulfonic acid/formaldehyde condensates (see e.g. EP-A 407 889, WO 98/03576), naphthalenesulfonic acid/formaldehyde condensates (see e.g. WO 98/03577), homo- and copolymers of 2-acrylamido-2-methylpropanesulfonic acid (see e.g. EP-A 629 650, EP-A 671 435 and DE-A 195 39 460), copolymers of ethylenically unsaturated carboxylic acids, such as, in particular, acrylic acid, methacrylic acid and maleic acid, with hydrophobic comonomers, such as styrene (see e.g. EP 467 103) or olefins (see e.g. EP 9 169) or with hydroxyalkyl esters (see e.g. JP 59 162 161). Examples of cationic polymers are copolymers and terpolymers of vinylpyrrolidone and/or of vinylcaprolactam with 1-vinyl-3-alkylimidazolinium salts, e.g. with 1-vinyl-3-methylimidazolinium chloride or methosulfate; copolymers and terpolymers of vinylpyrrolidone and/or of vinylcaprolactam with (meth)acryloyloxyethyltrialkylammonium salts or with (meth)acryloyloxyethylammonium salts. Such cationic polymers are known to the person skilled in the art and are available commercially.

Suitable amphoteric polymers are copolymers of acrylic acid and optionally hydrophobic monomers such as styrene and optionally water-soluble, neutral monomers with cationic monomers, e.g. copolymers of acrylic acid with styrene and with (meth)acryloxyethyltrialkylammonium salts, and optionally with further comonomers such as (meth)acrylamide and acetonitrile. Such copolymers are known, for example, from EP-A 51 144.

The spray-drying is preferably carried out without spray auxiliaries.

The dye-containing microcapsule dispersions obtained according to the invention, and the microcapsule powders are characterized by a high brilliance. They are particularly suitable for incorporation into nonpolar media, for example as color-imparting component in printing inks, alkyl resin varnishes, e.g. melamine-alkyl resin stoving enamels or for coloring plastic fibers or plastic compositions.

The dye-containing microcapsule dispersions according to the invention and the dye-containing microcapsule powders obtainable therefrom are characterized, even after incorporation into high molecular weight application media such as varnishes, printing inks, plastics or inorganic materials, by high color intensity and high brilliance, and good transparency. In contrast to conventional pigments, a dependency of the color shade on the microcapsule particle size is not observed. Moreover, in contrast to conventional pigments, the microcapsule dispersions according to the invention do not have shape anisotropy and thus associated rheology problems, and also have a narrow particle size distribution. In addition, the average particle size can be determined readily via the particle size of the emulsion droplets. Moreover, the microcapsule dispersions according to the invention are characterized, compared with conventional pigments, by a very much lower requirement of expensive chromophore for achieving the same color impression. Furthermore, the dyes in the microcapsules are better protected against bleaching as a result of the effect of UV radiation or oxygen than conventional dyes or pigment. Substrates treated with the novel microcapsule dispersions comprising optical brighteners exhibit a lower tendency toward yellowing, in particular when exposed to UV radiation or under the action of elevated temperature. In addition, where such microcapsule dispersions are used, a degree of whiteness comparable with that of conventional optical brighteners is achieved even with relatively small amounts of optical brightener. Microcapsule dispersions according to the invention which comprise optical brighteners are particularly suitable as brightening constituent in paper coating slips. They can also be added to the paper pulps themselves as brightening constituent to improve the degree of whiteness.

The examples given below serve to illustrate the present invention in more detail.

EXAMPLE 1

In a cylindrical 2 l stirred vessel, 16.4 g of an orange dye, dissolved in a clear aqueous solution, adjusted to pH 4.5 using formic acid, of 115 g of partially methylated precondensate (comprises 2.3 $CH_3O$ groups per melamine molecule) of 1 mol of melamine and 5.25 mol of formaldehyde in 229 g of ethylene glycol and 63.45 g of water (70:30) were dispersed in a solution of 75 g of protective colloid D (described in DE-A 3709921, p. 10) in 548 g of cyclohexane in a dispersion apparatus (®Turrax 45 N, Jahnke & Kunkel) at a rotary speed of 8 000 rpm. The resulting emulsion was heated to 60° C. at a stirring speed of 1 000 rpm. After 120 min, the temperature was increased to 70° C. After a further 90 min, the dispersion was cooled to room temperature.

The resulting dispersion was orange-milky and, according to microscopic assessment, contained individual capsules of predominantly 1 to 5 µm in diameter. The viscosity was 4.02 mPas at a shear rate of 250 l/s and a solids content of 38.5% by weight.

EXAMPLE 2

A microcapsule dispersion was prepared according to example 1. The dye used was 16.4 of a green dye. The dye was dissolved together with 115 g of partially methylated precondensate in 292 g of water which had been adjusted to pH 4.5 with formic acid. The resulting dispersion was milky-green and, according to microscopic assessment, contained individual capsules predominantly 1 to 5 µm in diameter. The viscosity was 8.04 mPas at a shear rate of 250 l/s and a solids content of 38.5% by weight.

The given viscosities (mPas) were determined in accordance with ISO 3219 (DIN 53019) using a Physica MC20 viscometer in the Z1 measuring system. The capsule diameter was determined optically at 400× magnification using a microscope from Leitz (Diaplan 101/107).

EXAMPLE 3

200 g of the dispersion from example 1 were dried in a laboratory spray dryer (#190 from Büchi) at 70° C. and a delivery rate of 300 g/h. This gave 61 g of an orange-colored powder.

To test the capsule quality, 5 g of microcapsule powder were dispersed in 100 ml of water at a stirring rate of 200 rpm and stirred for 90 min at 20° C. Following sedimentation of the powder, no coloration of the water is discernible.

EXAMPLE 4

A powder was prepared from the dispersion described in example 2 analogously to example 3. 200 g of dispersion gave 58 g of a green powder. The test analogous to example 3 for imperviousness against water likewise revealed, following sedimentation of the green powder, no discernible coloration of the water.

We claim:

1. A process for the preparation of microcapsules having a capsule core comprising water-soluble organic substances as solution in a hydrophillic solvent, and a capsule coating which is a condensate of formaldehyde resins and/or alkyl ethers thereof, by condensing formaldehyde resins in the hydrophilic phase of a water-in-oil emulsion in the presence of a protective colloid.

2. The process for the preparation of microcapsules as claimed in claim 1, wherein the capsule coating is a condensate of melamine-formaldehyde resins and/or methyl ethers thereof.

3. The process for the preparation of microcapsules as claimed in claim 1, wherein the capsule core comprises water-soluble dyes as water-soluble organic substances.

4. The process for the preparation of microcapsules as claimed in claim 1, wherein its average particle size is 0.5 to 50 μm.

5. The process for the preparation of microcapsules as claimed in claim 1, wherein the protective colloid is a graft polymer obtained by grafting polymers (A) comprising:
   a) 40 to 95% by weight of monovinylaromatic monomers;
   b) 5 to 60% by weight of monoethylenically unsaturated carboxylic acids having 3 to 6 carbon atoms, maleic anhydride and/or itaconic anhydride; and
   c) 0 to 20% by weight of other monoethylenically unsaturated monomers, with the proviso that the sum of the percentages by weight (a) to (c) is always 100 and the polymers (A) have a molecular weight (number-average) of from 500 to 20 000, with monomer mixtures of:
   a) 70 to 100% by weight of acrylic esters and/or methacrylic esters of monohydric alcohols containing 1 to 20 carbon atoms;
   b) 0 to 15% by weight of monoethylenically unsaturated carboxylic acids having 3 to 6 carbon atoms, maleic anhydride and/or itaconic anhydride;
   c) 0 to 10% by weight of acrylic monoesters and/or methacrylic monoesters of at least dihydric alcohols;
   d) 0 to 15% by weight of monovinylaromatic monomers; and
   e) 0 to 7.5% by weight of acrylamide and/or methacrylamide with the proviso that the sum of the percentages by weight a) to e) is always 100, where the monomers are used in an amount of from 50 to 97.5% by weight, based on the mixture of polymers (A) and monomers.

6. The process for the preparation of microcapsules as claimed in claim 1, wherein the condensation is carried out in the temperature range from 40 to 150° C.

7. A microcapsule obtained by a process as claimed in claim 1.

8. A printing ink, alkyl resin paint, plastic fiber or plastic composition comprising microcapsules as claimed in claim 7 in the form of a polymer dispersion or a polymer powder.

9. A printing ink, alkyl resin paint, plastic fiber or plastic composition comprising microcapsules as claimed in claim 3 in the form of a polymer dispersion or a polymer powder as a color-imparting constituent.

10. A plastic composition comprising 0.1 to 50% by weight, based on the total weight of the plastic composition, of microcapsules as claimed in claim 7 comprising water-soluble dyes and additives customary for plastic compositions.

* * * * *